United States Patent
Wagner et al.

[15] 3,691,186
[45] Sept. 12, 1972

[54] CERTAIN SUBSTITUTED BENZTHIAZOLE-N-OXIDES AND THEIR PREPARATION

[72] Inventors: Klaus Wagner; Ernst Roos, both of Cologne, Germany

[73] Assignee: Farbenfabriken Bayer Aktiengesellschaft, Liverkusen, Germany

[22] Filed: Jan. 29, 1970

[21] Appl. No.: 6,922

[30] Foreign Application Priority Data

Jan. 31, 1970 Germany..........P 19 04 653.8

[52] U.S. Cl. ..................260/304, 260/37, 260/306, 260/465 G, 260/471 R, 260/505 R, 260/556 B, 260/607 A, 260/646
[51] Int. Cl. ..............................................C07d 91/44
[58] Field of Search..............................260/304, 306

[56] References Cited

UNITED STATES PATENTS 3,187,001  6/1965  Meyer et al................260/304

*Primary Examiner*—Alex Mazel
*Assistant Examiner*—R. J. Gallagher
*Attorney*—Burgess, Dinklage & Sprung

[57] ABSTRACT

Novel benzthiazole-N-oxides are obtainable by the reaction of halogenonitrobenzenes additionally activated by one or more electronegative substituents with mercaptomethyl compounds in an inert solvent in the presence of a base in the temperature range of from 20° to 160° C.

The new benzthiazole-N-oxides are suitable for use as colored pigments e.g. for dyeing plastics.

10 Claims, No Drawings

CERTAIN SUBSTITUTED BENZTHIAZOLE-N-OXIDES AND THEIR PREPARATION

This invention relates to novel benzthiazole-N-oxides and to a process for their production in which substituted halogen nitrobenzenes additionally activated by electronegative substituents are reacted with a compound of the general formula $$HS-CH_2-R$$

in which R represents an electronegative group, in an inert solvent in the presence of bases.

Nitrobenzene derivatives of the general formula

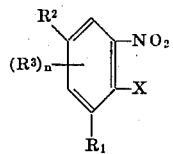

are preferably used as starting products in the process according to the invention. In this formula, X represents a halogen atom, $R_1$ represents an electronegative radical, $R_2$ represents an electronegative radical, $R_3$ represents hydrogen or an aliphatic radical and $n = 1$ or 2.

Suitable halogen atoms (X) include fluorine, bromine, iodine and, preferably, chlorine.

Although the nitro group represents the preferred electronegative radical ($R_1$), the groups $CF_3$ and $-SO_2Y$ are also suitable, Y representing an aliphatic, araliphatic or aromatic radical and even an optionally substituted amino group. The group $-SO_3M$ also represents a suitable electronegative radical ($R_1$), M representing the equivalent of an alkali metal (preferably sodium, potassium) or alkaline earth metal (calcium).

In this context, aliphatic radicals (Y) include those containing from 1 to 8 and preferably from one to four carbon atoms which optionally may also be branched. Naturally, aliphatic radicals also include the cycloaliphatic radicals, those containing five or six carbon atoms in the ring system being preferred.

Araliphatic radicals (Y) contain one to four and preferably one or two carbon atoms in the aliphatic chain and as the aromatic radical preferably the phenyl radical. The phenyl radical represents the preferred aromatic radical (Y).

Where Y represents an optionally substituted amino group, one or both hydrogen atoms may be replaced by lower alkyl groups or even by five- or six-membered cycloaliphatic radicals. The alkyl groups together with the nitrogen atom may form part of a preferably five- or six-membered ring system. In the case of a six-ring, this ring preferably contains an oxygen or sulphur atom as the additional hetero atom, or even a nitrogen atom substituted by a lower alkyl group.

One of the hydrogen atoms of the amino group may optionally also be substituted by a phenyl radical.

Suitable electronegative radicals ($R_2$) include not only those mentioned in reference to $R_1$ with the same scope of meaning, but also the cyano group and the carbalkoxy radical, in which case the carboxyl group can be esterified not only with an aliphatic or araliphatic alcohol but also with a phenol. These radicals have the same scope of meaning as the aliphatic, araliphatic or aromatic radicals ($R_1$).

Aliphatic radicals $R_3$ include those containing from one to eight, and preferably from one to four carbon atoms, cycloaliphatic radicals containing five or six carbon atoms in the ring system being mentioned by way of preference.

The electronegative radicals R include preferably carbalkoxy groups especially those containing from one to four carbon atoms, and also the cyano group and the radical $-CO-Z$. Z representing hydrogen, an alkoxy group containing from one to eight and preferably from one to four carbon atoms and also an aliphatic, araliphatic or aromatic radical with the same scope of meaning as that indicated in reference to $R_1$.

The following represent examples of suitable nitrobenzene compounds:

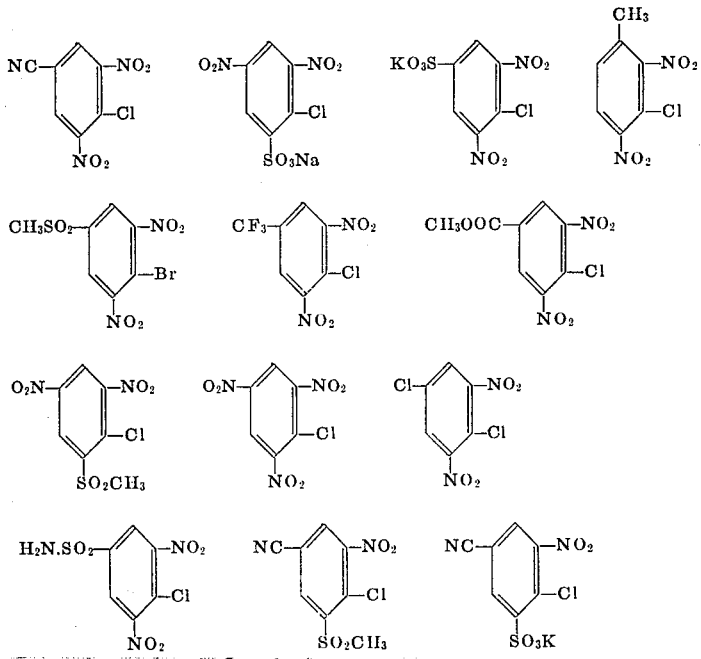

Examples of suitable mercapto compounds include inter alia mercapto acetone, mercapto acetaldehyde, phenacylmercaptan, mercapto acetonitrile, preferably thioglycolic acid ester.

The process according to he invention is carried out in the presence of water and/or organic solvents at temperatures of from 20° to 160°C, more particularly at temperatures of from 40° to 80°C. Examples of suitable organic solvents include methanol, ethanol, propanol, i-propanol, toluene, dioxan, tetrahydrofuran.

The process is normally carried out by reacting equimolar quantities of the corresponding nitrobenzene derivative and the condensation component in benzene for example at temperatures of from 40° to 80°C with somewhat more than the equimolar quantity by weight of a tertiary base such as for example trimethyl amine, triethyl amine, tributyl amine, endomethylene piperazine or even N,N-dimethylbenzylamine in portions, and stirring the reaction mixture for a while at around 60°C.

Some of the novel benzthiazole-N-oxides formed through the reaction are precipitated during the reaction in the form of yellow to reddish brown crystalline compounds which can be separated off by the usual methods and after washing with water can be isolated in pure form and in high yields. Where necessary the solvent should be removed in vacuo and the solid residue obtained treated as described above. In the case of salts ($R^2 = -SO_3M$), the free acids ($R^2 = -SO_3H$) can be obtained in the usual way.

The novel benzthiazole-N-oxides that can be obtained by the process according to the invention correspond to the general formula

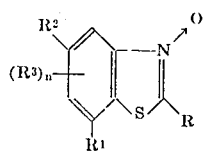

in which the radicals have the meanings defined above; where $R^2 = -SO_3M$, M can also represent hydrogen.

The claimed process is illustrated by the following general reaction equation in which the radicals are as defined above:

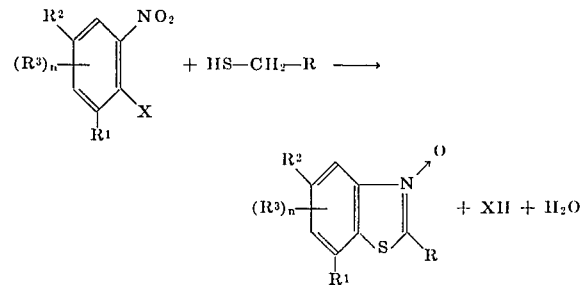

In other words, the reaction is accompanied not only by elimination of the group X in the form of the corresponding hydrogen halide but also by cyclization with the nitro group in the o-position to give the benzthiazole-N-oxide derivative.

Some of the benzthiazole-N-oxides that can be obtained by the process according to the invention are reproduced in the following:

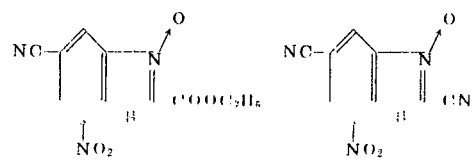

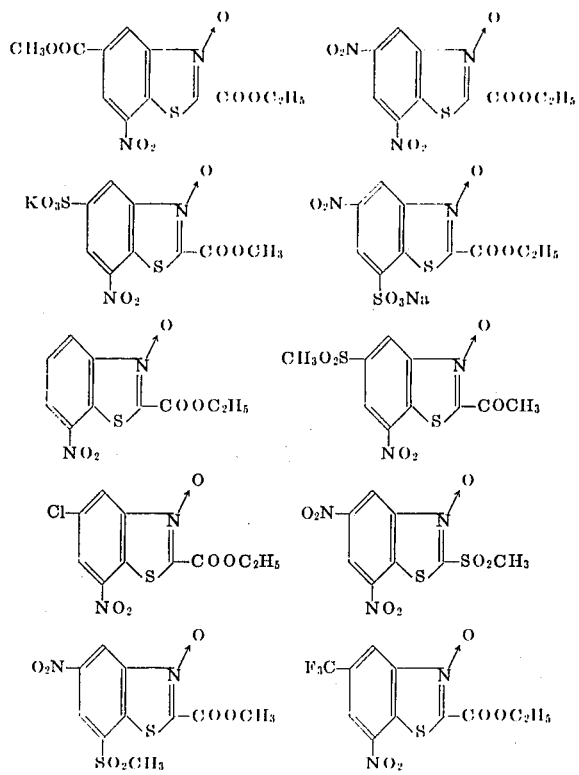

The substituted benzthiazole-N-oxides are suitable for use as yellow, orange or reddish brown pigments for example for dyeing plastics.

EXAMPLE 1

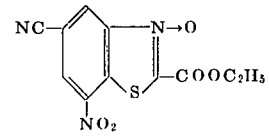

45.4 g (0.2 mol) of 2,6-dinitro-4-cyano chlorobenzene and 24 g (0.2 mol) of thioglycolic acid ethyl ester are dissolved in 700 cc of benzene. 22 g (0.2 mol + 10% excess) of triethyl amine are added dropwise to this solution at 30° to 50°C, occasional cooling with ice water being necessary. On completion of the dropwise addition, the reaction mixture is stirred for 3 hours at 50°C and filtered under suction after cooling. The filter residue is washed with water and dried. 47 g (80 percent of the theoretical) of 2-carbethoxy-5-cyano-7-nitrobenzthiazole-N-oxide are obtained in the form of a yellow powder decomposing at 170°C. For further purification the product can be dissolved in and crystallized from ethylene glycol monoethyl ether.
Analysis: $C_{11}H_7N_3O_5S$ (293.2)
  Calculated: C: 45.1 H: 2.4 O: 27.3 N: 14.3 S: 10.9
  Found: C: 45.2 H: 2.8 O: 27.2 N: 14.7 S: 10.8

EXAMPLE 2

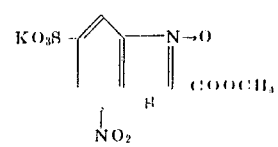

96 g (0.3 mol) of potassium 4-chloro-3,5-dinitrobenzene sulphate and 36 g (0.3 mol) of thioglycolic acid ethyl ester are suspended in 750 cc of methanol. 33 g (0.3 mol + 10% excess) of triethylamine are then added dropwise and the reaction mixture kept at 60°C, occasionally being cooled with ice water. After the triethylamine has been added, the reaction mixture is stirred for 6 hours at 60°C. After cooling, the yellowish brown crystal paste is filtered under suction and washed with a little methanol. 5-potassium-2-carbmethoxy-7-nitrobenzthiazole-N-oxide sulphonate is obtained in a yield of 75 g (68 percent of the theoretical). For further purification, the product can be dissolved in and crystallized from water. Accordingly, transesterification occurs in addition to cyclization in the above reaction.

Analysis: $C_9H_5N_2O_8S_2K$

Calculated: C: 29.1 H: 1.5 O: 34.4 N: 7.5 S: 17.2
Found: C: 29.1 H: 1.8 O: 33.9 N: 7.8 S: 17.0

EXAMPLE 3

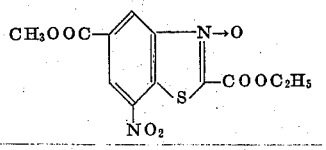

52.0 g (0.2 mol) of 2,6-dinitro-4-carbmethoxy chlorobenzene and 24 g (0.2 mol) of thioglycolic acid ethyl ester are dissolved in 600 cc of benzene. 22 g (0.2 mol + 10% excess) of triethyl amine are added dropwise to this solution at 30 to 60°C. After the triethyl amine has been added, the reaction mixture is stirred for 2 hours at 70°C, the triethyl amine hydrochloride precipitated is filtered under suction after cooling and the benzene distilled off in vacuo. Forpurification, the solid residue is dissolved in and crystallized from ethyl acetate/dioxan. 2-carbethoxy-5-carbmethoxy-7-nitrobenzthiazole-N-oxide melting at 148°C is obtained in a yield of 40 g or 61 percent of the theoretical.

Analysis: $C_{12}H_{10}N_2O_7S$ (326.3)

Calculated: C: 44.2 H: 3.1 O: 34.3 N: 8.5 S: 9.8
Found: C: 44.5 H: 3.2 O: 34.2 N: 8.7 S: 9.9

EXAMPLE 4

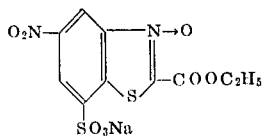

91.2 g (0.3 mol) of sodium 6-chlor-3,5-dinitrobenzene sulphonate and 36 g (0.3 mol) of thioglycolic acid ethyl ester are reacted in 750 cc of methanol with 33 g (0.3 mol + 10% excess) of triethyl amine as in Example 2. 7-sodium-2-carbethoxy-5-nitrobenzthiazole-N-oxide sulphonate is obtained in a yield of 81 g (73 percent of the theoretical). The product crystallizes from water in the form of small yellow needles.

Analysis: $C_{10}H_7N_2O_8S_2Na$ (370.3)

Calculated: C: 32.4 H: 2.0 O: 34.6 N: 7.5 S: 17.3
Found: C: 32.4 H: 2.1 O: 35.5 N: 7.7 S: 16.9

EXAMPLE 5

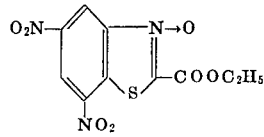

24.7 g (0.1 mol) of 2,4,6-trinitro chlorobenzene and 12 g (0.1 mol) of thioglycolic acid ethyl ester are dissolved in 300 cc of benzene. 11 g (0.1 mol + 10% excess) of triethyl amine are added dropwise to this solution at 30° to 50°C, occasional cooling of the highly exothermic reaction with ice water being necessary. After the triethyl amine has been added, the reaction mixture is stirred for 2 hours at 50°C. After cooling, the brownish red crystal paste is suction filtered, the filter residue washed with water and the residue recrystallized from ethyl acetate. 2-carbethoxy-5,7-dinitro benzthiazole-N-oxide in the form of brownish yellow crystals is obtained in a yield of 18 g (52 percent of the theoretical).

Analysis: $C_{10}H_7N_3O_7S$ (313.2)

Calculated: C: 38.4 H: 2.2 O: 35.8 N: 13.4 S: 10.2
Found: C: 39.1 H: 2.9 O: 35.2 N: 13.0 S: 9.7

What is claimed is:

1. Benzthiazole-N-oxides of the formula

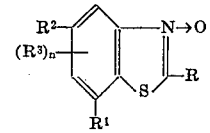

wherein

R represents a cyano group, $-SO_2CH_3$, or the radical $-CO-Z$ in which Z represents hydrogen, an alkoxy group having one to eight carbon atoms, an alkyl radical having one to eight carbon atoms, a cycloalkyl radical having five to six carbon atoms, a phenylalkyl radical with one to four carbon atoms in the alkyl portion or a phenyl radical;

$R^1$ represents $-NO_2$, $-CF_3$, a group of its formula $-SO_2Y$ wherein Y is the same as Z defined previously and in addition an optionally substituted amino group wherein one or both hydrogen atoms can be replaced by alkyl of one to eight carbon atoms or cycloalkyl of five to six carbon atoms, a group of the formula $-SO_3M$ in which M represents hydrogen or the equivalent of an alkali or alkaline earth metal;

$R^2$ represents hydrogen, a cyano group, carboalkoxy radical having one to eight carbon atoms, $-NO_2$, $-CF_3$, $-Cl$, a group of the formula $-SO_2Y$ wherein Y is as defined previously, or a group of the formula $-SO_3M$ in which M represents hydrogen or the equivalent of an alkali or alkaline earth metal;

$R^3$ represents hydrogen or alkyl having one to eight carbon atoms or cycloalkyl having five to six carbon atoms; and $n$ represents 1 or 2.

2. 2-carbethoxy-5-cyano-7-nitro-benzthiazole-N-oxide.

3. Potassium 2-carbomethoxy-7-nitro-benzthiazole-N-oxide-5-sulphonate.

4. 2-carbethoxy-5-carbmethoxy-7-nitro-benzthiazole-N-oxide.

5. Sodium 2-carbethoxy-5-nitro-benzthiazole-N-oxide-7-sulphonate.

6. 2-carbethoxy-5,7-dinitro-benzthiazole-N-oxide.

7. A process for the production of benzthiazole-N-oxides, wherein a substituted halogenonitrobenzene having the general formula

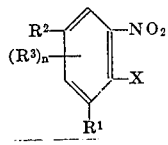

in which X represents a halogen atom:
$R^1$ represents $-NO_2$, $-CF_3$, a group of its formula $-SO_2Y$ wherein Y is the same as Z defined previously and in addition an optionally substituted amino group wherein one or both hydrogen atoms can be replaced by alkyl of one to eight carbon atoms or cycloalkyl of five to fix carbon atoms, a group of the formula $-SO_3M$ in which M represents hydrogen or the equivalent of an alkali or alkaline earth metal;
$R^2$ represents hydrogen, a cyano group, carboalkoxy radical having one to eight carbon atoms, $-NO_2$, $-CF_3$, $-Cl$, a group of the formula $-SO_2Y$ wherein Y is as defined previously, or a group of the formula $-SO_3M$ in which M represents hydrogen or the equivalent of an alkali or alkaline earth metal;
$R^3$ represents hydrogen or alkyl having one to eight carbon atoms or cycloalkyl having five to six carbon atoms; and n represents 1 or 2.
is reacted with a mercaptomethyl compound of the general formula $$HS-CH_2-R$$

in which
R represents a cyano group, $-SO_2CH_3$, or the radical $-CO-Z$ in which Z represents hydrogen, an alkoxy group having one to eight carbon atoms, an alkyl radical having one to eight carbon atoms, a cycloalkyl radical having five to six carbon atoms, a phenylalkyl radical with one to four carbon atoms in the alkyl portion or a phenyl radical, in an inert solvent in the presence of a base at temperatures from 20° to 160°C.

8. A process as claimed in claim 1 wherein the inert solvent is water and/or an organic solvent.

9. A process as claimed in claim 7 wherein the mercapto-methyl compound is mercapto-acetone, mercapto-acetaldehyde, phenacyl mercaptan, mercapto-acetonitrile or thioglycolic acid ester.

10. A process as claimed in claim 7 wherein the base is trimethylamine, triethylamine, tributylamine, endomethylene piperazine or N,N-dimethyl-benzylamine.

* * * * *

Farben 1730

UNITED STATES PATENT OFFICE
CERTIFICATE OF CORRECTION

Patent No. 3,691,186                    Dated September 12, 1972

Inventor(s) KLAUS WAGNER and ERNST ROOS

It is certified that error appears in the above-identified patent and that said Letters Patent are hereby corrected as shown below:

Front Page, under "Foreign Application Priority Data"
         "1970" should read -- 1969 --

Col. 2, line 33, "Z.Z" should read "Z,Z"

Signed and sealed this 6th day of March 1973.

(SEAL)
Attest:

EDWARD M. FLETCHER, JR.					ROBERT GOTTSCHALK
Attesting Officer					Commissioner of Patents